United States Patent Office 3,741,971
Patented June 26, 1973

3,741,971
WATER-INSOLUBLE BENZOXANTHENE-DICARBOXYLIC ACID IMIDE DYESTUFFS AND PROCESS FOR PREPARING THEM
Otto Fuchs and Helmut Troster, Frankfurt am Main, Germany, assignors to Farbwerke Hoechst Aktiengesellschaft vormals Meister Lucius & Bruning, Frankfurt am Main, Germany
No Drawing. Continuation of abandoned application Ser. No. 771,608, Oct. 29, 1968. This application May 10, 1971, Ser. No. 142,048
Claims priority, application Germany, Nov. 2, 1967, P 53,937; July 6, 1968, P 17 70 818.8
Int. Cl. C07d *39/00*
U.S. Cl. 260—281    8 Claims

ABSTRACT OF THE DISCLOSURE

Benzoxanthene-dicarboxylic acid imide dyestuffs which dyestuffs have a yellow to greenish yellow shade and are excellently suited as fluorescent dyestuffs for the dyeing in the mass of synthetic polymers and for the preparation of daylight luminous paints. Moreover, they can be used for the dyeing of polyethylene glycol terephthalate and acetyl cellulose.

---

This application is a contiuation of copending application Ser. No. 771,608 filed Oct. 29, 1968, now abandoned.

The present invention provides new valuable, water-insoluble benzoxanthene-dicarboxylic acid imide dyestuffs and a process for preparing them.

More particularly, the present invention provides water-insoluble benzoxanthene-dicarboxylic acid imide dyestuffs of the general Formula 1

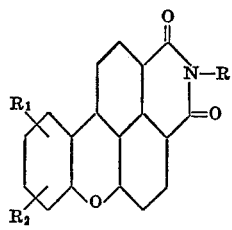

wherein R represents a hydrogen atom or an alkyl group which may be substituted, for example by hydroxyl, alkoxy, alkoxy-alkoxy, N-dialkylamino, acyloxy, cycloalkoxy, carboxylic acid or phenyl groups, and which may contain from 1 to about 20 carbon atoms, a cycloalkyl group such, for example as the cyclohexyl group, furthermore an aryl group which may be substituted, for example by alkyl, alkoxy, sulfonamide, carbonamide, amino or hydroxy groups or halogen atoms, a heterocyclic group such, for example as the pyridyl group, a hydroxy or amino group, $R_1$ and $R_2$ represent hydrogen atoms, halogen atoms, such as chlorine or bromine atoms, nitrile groups, carbalkoxy groups such, for example as carbomethoxy groups, alkyl, alkoxy or aryl groups.

Furthermore, the present invention provides processes for preparing the water-insoluble benzoxanthene-dicarboxylic acid imide dyestuffs of the above-identified general Formula 1, wherein either (a) The diazonium salts of 4-phenoxy-5-amino-naphthalic acid imides or 4-(2'-aminophenoxy)-naphthalic acid imides of the general Formula 2

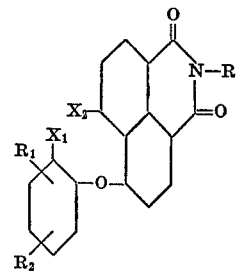

in which $X_1$ represents a hydrogen atom and $X_2$ represents an amino group or $X_1$ represents an amino group and $X_2$ represents a hydrogen atom, and R, $R_1$ and $R_2$ each have the meanings given above, are heated to temperatures in the range of from about 60° C. to about 100° C. in the presence of elementary copper or of copper salts, preferably copper-(II) salts, for example copper-(II) sulfate or copper-(II) acetate, or (b) The diazonium salts of 4-phenoxy-5-amino-naphthalic acids or of 4-(2'-aminophenoxy)-naphthalic acids or anhydrides of the general Formulae 3 and 4

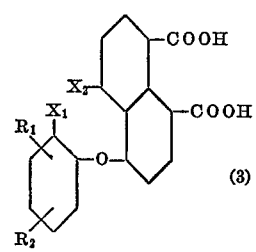 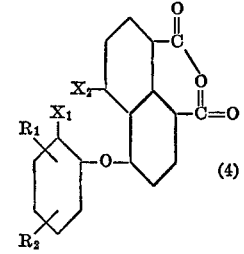

in which $R_1$ and $R_2$ and $X_1$ and $X_2$ have the meanings given above, are heated to temperatures in the range of from about 60° C. to about 100° C. in the presence of elementary copper or copper salts, preferably copper-(II) salts such, for example as copper-(II) sulfate or copper-(II)-acetate, and the benzoxanthene derivatives thus obtained of the general Formulae 5 and 6

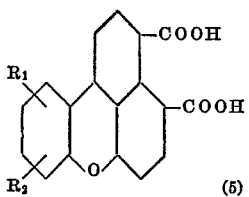 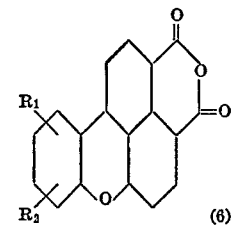

are condensed with an amine of the Formula 7

in which R has the meaning given above, at temperatures in the range of from 100° C. to about 200° C.

The ring closure according to methods (a) and (b) can be effected in various manner. Thus, it is possible to allow the acetic acid or mineral acid diazo solution or suspension to run into a boiling aqueous neutral acidic or basic copper salt solution or to mix it with a copper salt solution and subsequently to heat it, or to stir copper powder into the diazo solution and to heat the whole subsequently until termination of the evolution of nitrogen.

The dyestuffs obtainable according to method (a) are isolated in the usual manner.

The benzoxanthene derivatives of the Formulae 5 and 6 obtained at first according to method (b) are isolated in the usual manner and then condensed in a manner known per se with the amines of the Formula 7. This is suitably effected by heating the benzoxanthene-dicarboxylic acids or their anhydrides, that may be substituted, with an excess of amines or in an inert orgenic solvent, for example methanol, ethanol, isopropanol, an ethylene-glycol monoalkyl ether or dimethylformamide, for a prolonged period of time, if desired under pressure. The dyestuffs that have formed separate from the reaction mixture and can be isolated in the usual manner.

As amines for the condensation with the benzoxanthenedicarboxylic acids or their anhydrides, there may also be used, in addition to ammonia, hydroxylamine and hydrazines, aliphatic, cycloalphatic, aromatic, araliphatic and heterocyclic amines, for example methylamine, ethylamine, butllamine, octylamine, dodecylamine, stearylamine, isopropylamine, ethanol- or propanol-amine, methoxyethylamine, methoxypropylamine, methoxybutylamine or butoxypropylamine, isoproproxypropylamine, methoxyethoxypropylamine, cyclohexoxypropylamine, 2-phenylethylamine, N - dialkylaminoethylamines, cyclohexylamine, aniline, chloroanilines, anisidines, toluidines, xylidines, cyclohexylaniline and aminopyridine.

The 4-phenoxy-5-amino-naphthalic acid mdes used n method (a) can be prepared in known manner by condensing 4-bromo-5-amino- or 4-chloro-5-amino-naphthalic acid imides with phenol or substituted phenols in organic solvents, for example ethanol, butanol, glycol-monoalkyl ethers, dimethylformamide or pyridine, if desired or required in the presence of substances showing a basic reaction.

The 4-(2'-aminophenoxy)-naphthalic acid imides can likewise be prepared in known manner, for example by condensing 4-bromo- or 4-chloro-naphthalic acid imides with unsubstituted or correspondingly substituted o-nitrophenols in acid dialkylamides such as dimethylformamide, dimethylacetamide, N-methylpyrrolidone or phosphoric acid tris-dimethylamide, in the presence of substances having a basic reaction and subsequently reducing the nitro group to an amino group.

The compounds to be used in method (b) may be prepared in analogous manner, using the corresponding naphthalic acid anhydrides instead of the naphthalic acid imides.

The new valuable dyestuffs obtained according to the present invention are excellently suited as fluorescent dyestuffs for the colouring in the mass of synthetic polymers such as polystyrene, polyvinyl chloride, polymethacrylate, polyethylene and polypropylene, as well as for the manufacture of daylight luminous paints. They yield greenish yellow dyeings that have an intensively green fluorescence and that are distinguished by a high thermostability and, in some cases, by an excellent fastness to light. In addition thereto, the new dyestuffs have a very good affinity for polyethylene glycol terephthalates and acetyl cellulose. On these materials, they give brilliant greenish yellow dyeings which are distinguished by very good properties of fastness, especially by very good fastnesses to light, to wetting and to thermosetting.

In addition thereto, the products of the present invention are suitable for the dyeing in the mass of synthetic fiber-forming polymers, for example polyethylene glycol terephthalate or polyamides and, owing to the good solubility in organic solvents of some of the dyestuffs, for the colouring of varnishes and oils.

The following examples illustrate the invention but they are not intended to limit it thereto:

EXAMPLE 1

10.9 parts by weight of concentrated hydrochloric acid were allowed to run, while stirring, into a mixture of 16.0 parts by weight of 4-phenoxy-5-amino-naphthalic acid-N-γ-methoxypropyl-imide and 190 parts by weight of glacial acetic acid, the whole was stirred for a short time and diluted with 44 parts by weight of water. The hydrochloride that had formed was then diazotized at 0–5° C. with a solution of 3.3 parts by weight of sodium nitrite in 44 parts by weight of water. The diazo solution was then introduced, within 1 hour, into a boiling solution of 44 parts by weight of copper sulfate in 660 parts by weight of water and 66 parts by weight of glacial acetic acid and the whole was kept boiling for 30 minutes. The lemon-yellow dyestuff obtained of the formula

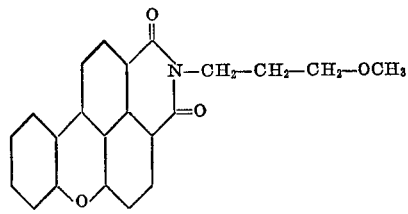

was filtered off with suction in the cold, washed with water and methanol and dried. It crystallized from a mixture of methyl glycol and ethanol in the form of small yellow needles, which were found to melt at 205–207° C.

*Analysis.*—Calc. (percent): C=73.5; H=4.7; N=3.9. Found (percent): C=73.3, C=73.0; H=4.7, H=4.8; N=4.0; N=4.1.

The dyestuff coloured polystyrene and polymethacrylate greenish yellow shades which showed an intensive green fluorescence and possessed very good fastness to light.

EXAMPLE 2

31.8 parts by weight of 4-phenoxy-5-amino-naphthalic acid-N-methyl-imide were dissolved in 250 parts by weight of concentrated sulfuric acid at room temperature, and diazotized at 0–5° C. with the calculated amount of nitrosyl-sulfuric acid. The diazo solution was poured onto 400 parts by weight of ice, whereupon the suspension obtained was introduced dropwise, within 1.5 hours, into a boiling solution of 100 parts by weight of water. After boiling for 1 hour, the reaction product that had precipitated was filtered off with suction in the cold, washed with water and methanol and dried. After recrystallization from dimethylformamide, the dyestuff of the formula

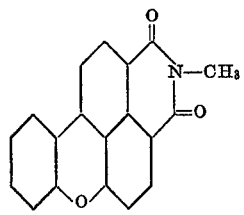

was obtained which dyed polystyrene and polymethacrylate shades that had a strongly green fluorsecence and a high fastness to light.

EXAMPLE 3

39.6 parts by weight of 4-(4'-methoxyphenoxy)-5-amino-naphthalic acid-N-γ-methoxy-propyl imide, suspended in 380 parts by weight of glacial acetic acid and 60 parts by weight of water, were diazotized by the addition of 31.2 parts by weight of concentrated hydrochloric acid and a solution of 9 parts by weight of sodium nitrite in 80 parts by weight of water, at 0–5° C. The diazo solution was then stirred, within one hour, into a boiling solution of 80 parts by weight of copper sulfate, 1000 parts by weight of water and 100 parts by weight of glacial acetic acid, kept for 1 hour at the boil and then worked up as usual. The dyestuff of the formula

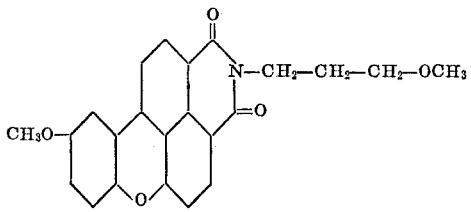

was obtained in the form of a yellow powder which dyed polystyrene and polymethacrylate materials yellow shades that showed bright green fluorescence and had very good fastness to light.

When using, instead of 4-(4'-methoxyphenoxy)-5-amino-naphthalic acid-N - γ - methoxy-propylimide, 4-(4'-ethoxyphenoxy)-5-amino-, 4-(3'-methylphenoxy)-5-amino-, 4-(3',4'-dimethyl-phenoxy)-5-amino-, 4-(2'-chlorophenoxy)-5-amino-, 4-(3'-bromophenoxy)-5-amino-, 4-3',4'-dichlorophenoxy)-5-amino-, 4-(3'-methyl-4'-chlorophenoxy)-5-amino- or 4-(2'-chloro-4'-methylphenoxy)-5-amino - naphthalic acid-N-γ-methoxy - propylimide, dyestuffs were obtained which yielded dyeings that had similar properties.

EXAMPLE 4

(A) A suspension of 9.2 parts by weight of 4-phenoxy-5-amino-naphthalic acid anhydride in 90 parts by weight of glacial acetic acid, 15 parts by weight of water and 8.9 parts by weight of concentrated hydrochloric acid was heated to 70–80° C. and the hydrochloride that had formed during this time was diazoted at 0–5° C. with a solution of 2.2 parts by weight of sodium nitrite in 20 parts by weight of water. The whole was then stirred for one hour at room temperature, filtered and the diazo solution was introduced dropwise, within 1 hour into a boiling solution of 21 parts by weight of copper sulfate in 300 parts by weight of water. The reaction product that separated was filtered off with suction while cold, washed with water and methanol and dried. The anhydride of benzoxanthene-3,4-dicarboxylic acid thus obtained crystallized from dimethylformamide in the form of small yellow crystals.

(B) 14.4 parts by weight of the benzoxanthene-dicarboxylic acid anhydride obtained according to (A), 250 parts by weight of ethylene glycol monomethyl ether and 9 parts by weight of ethanolamine were heated for 6 hours under reflux. After termination of the reaction, the dyestuff obtained of the formula

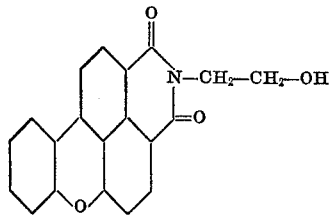

was filtered off with suction in the cold, washed with methanol and dried. On polyester fibers, this dyestuff gave greenish yellow dyeings having very good fastness to light and to thermosetting.

(C) A mixture of 28.8 parts by weight of the benzoxanthenedicarboxylic acid anhydride obtained according to (A) and 180 parts by weight of 1-amino-2,4-dimethylbenzene was stirred for 5 hours at 170–180° C.

After cooling, the reaction mixture was diluted with 150 parts by weight of methanol and the dyestuff that had formed of the formula

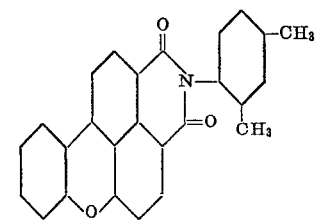

was filtered off with suction, washed with methanol and dried. It dyed polystyrene and polymethacrylate structures greenish yellow, green fluorescent shades having high fastness to light.

(D) 28.8 parts by weight of the acid anhydride obtained according to (A) were stirred for 4 hours at 120–130° C., in an autoclave, in 250 parts by weight of a 20% by weight aqueous solution of methylamine and 200 parts by weight of ethanol. The dyestuff isolated in the usual manner, dyed polystyrene and polymethacrylate green-yellow shades that had a strongly green fluorescence.

EXAMPLE 5

37.6 parts by weight of 4-(2'-aminophenoxy)-naphthalic acid N-γ-methoxy-propyl imide were suspended in 250 parts by weight of 50% acetic acid. After the addition of 23.5 parts by weight of concentrated hydrochloric acid, the whole was stirred for a short period of time and the hydrochloride that had formed was then diazotized at 0–5° C. with 18.5 parts by weight of 40% sodium nitrite solution. The diazo solution was then added dropwise, within 1 hour, to a boiling solution of 25 parts by weight of copper sulfate in 625 parts by weight of water and 75 parts by weight of glacial acetic acid. The crude dyestuff thus obtained was purified by recrystallization from methyl-glycol. It was identical with the product obtained according to Example 1. It yielded on fibrous material of polyethylene glycol terephthalate brilliant lemon-yellow dyeings which were distinguished by very good fastness to light and to wetting.

EXAMPLE 6

(a) 61 parts by weight of 4-(2'-aminophenoxy)-naphthalic acid-anhydride were introduced, while stirring, into a mixture of 480 parts by weight of glacial acetic acid and 47 parts by weight of concentrated hydrochloric acid. After dilution with 100 parts by weight of water, the amino compound was diazotized by dropwise addition of 37.4 parts by weight of 40% sodium nitrite solution at 0–5° C. After having stirred for half an hour, the diazo solution was introduced dropwise into a boiling solution of 100 parts by weight of copper sulfate in 2000 parts by weight of 20% acetic acid, whereupon the anhydride of the benzoxanthene-3,4-dicarboxylic acid separated in the form of yellow crystals. After recrystallization from dimethylformamide, it was found to be identical with the product described in Example 4(A).

Analysis.—Calc. (percent): C=75.0; H=2.8. Found (percent): C=75.2; H=2.9.

(b) 8.7 parts by weight of the benzoxanthene-3,4-dicarboxylic acid anhydride obtained according to (a) were stirred for 5 hours at the boiling temperature with 4.0 parts by weight of butylamine in 120 parts by weight of methyl glycol. The dyestuff of the formula

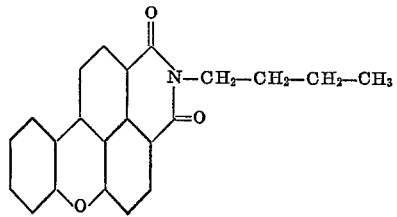

which crystallized upon cooling, gave in polystyrene and polymethacrylate green-yellow shades that showed an intensively green fluorescence and had a very good fastness to light.

(c) 57.6 parts by weight of the benzoxanthene-3,4-dicarboxylic acid anhydride obtained according to (a) were introduced at 150–155° C., within about 30 minutes, into the molten mass of 62.0 parts by weight of stearylamine and the reaction mixture was further stirred for 2 hours at 150–160° C. The molten mass was then cooled to 130° C. and diluted by the addition of 300 parts by weight of butyl acetate. The dyestuff that had precipitated was filtered off with suction in the cold, washed with butyl acetate and methanol and dried. The dyestuff had a good solubility in gasoline and mineral oil. It dyed polystyrene and polymethacrylate green-yellow shades that showed a strongly green fluorescence and that had a very good fastness to light.

(d) A molten mass of 20 parts by weight of the benzoxanthenedicarboxylic acid anhydride obtained according to (a) and 100 parts by weight of 2-amino-pyridine was kept for 5 hours at 170–180° C. The reaction mixture was then diluted at 80° C. with 200 parts by weight of methanol and the dyestuff of the formula

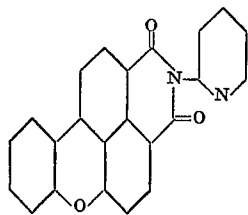

that had precipitated was isolated in the usual manner. In polystyrene and polymethacrylate materials and on polyethyleneglycol terephthalate, this dyestuff enabled the production of green-yellow dyeings showing a green fluorescence.

EXAMPLE 7

(a) 33.5 parts by weight of 4-(2'-amino-4'-methoxyphenoxy)naphthalic acid anhydride were stirred for half an hour in a mixture of 240 parts by weight of glacial acetic acid and 23.5 parts by weight of concentrated hydrochloric acid. The suspension was then diluted with 80 parts by weight of water and diazotized with 18.7 parts by weight of 40% sodium nitrite solution. The turbid diazo solution was clarified and introduced dropwise into a boiling solution of 35 parts by weight of copper acetate in 850 parts by weight of 20% acetic acid. The reaction product that had separated was isolated in the usual manner. For purification, it was stirred in the 4-fold quantity of boiling dimethylformamide. The 10-methoxy-benzoanthene-3,4-dicarboxylic acid anhydride was obtained in the form of a gold yellow powder. When using, instead of 4-(2'-amino-4'-methoxyphenoxy)-naphthalic acid anhydride, equivalent amounts of 4-(2'-amino-4' - bromo-phenoxy)-, 4-(2'-amino-5'-chlorophenoxy)-, 4-(2'-amino-4' - chloro-5'-methylphenoxy)-, 4-(2'-amino-4'-methylphenoxy)-, 4-(2'-amino-5' - methylphenoxy)- or 4-(2'-amino-5'-methoxy-phenoxy)-naphthalic acid anhydride, the correspondingly substituted benzoxanthene-3,4-dicarboxylic acid anhydrides were obtained.

(b) 31.8 parts by weight of the 10-methoxy-benzoxanthene-3,4-dicarboxylic acid anhydride, 8.5 parts by weight of butylamine and 450 parts by weight of ethanol were stirred for 5 hours in an autoclave at 130–135°

C. After conventional isolation, the yellow dyestuff of the formula

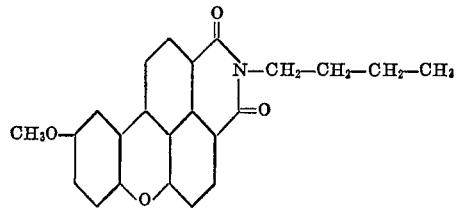

was obtained which permitted the production, on polyethylene glycol terephthalate fabrics of brilliant lemon yellow dyeings which were distinguished by very good general properties of fastness.

*Analysis.*—Calc. (percent): C=73.5; H=5.1; N=3.7. Found (percent): C=73.7; H=5.2; N=3.7.

The following table contains further yellow to yellow-green dyestuffs which can be obtained according to the methods described in the foregoing examples.

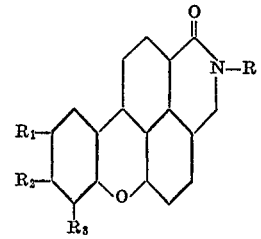

| Ex. | R | $R_1$ | $R_2$ | $R_3$ |
|---|---|---|---|---|
| 8 | —$CH_3$ | $OCH_3$ | H | H |
| 9 | —$(CH_2)_{17}CH_3$ | $CH_3$ | $CH_3$ | H |
| 10 | —$CH_2C_6H_5$ | H | $CH_3$ | H |
| 11 | —$(CH_2)_3OH$ | H | $CH_3$ | H |
| 12 | —$(CH_2)_3OCH_3$ | $OCH_3$ | H | H |
| 13 | —$(CH_2)_3O(CH_2)_3CH_3$ | Cl | H | H |
| 14 | —$(CH_2)_3O(CH_2)_2OCH_3$ | $OCH_3$ | H | H |
| 15 | —$(CH_2)_3O(CH_2)_3CH_3$ | H | Br | H |
| 16 | —$(CH_2)_2OCOCH_3$ | H | H | $CH_3$ |
| 17 | —$(CH_2)_3OCOCH_3$ | $CH_3$ | Cl | H |
| 18 | —$(CH_2)_2N(C_2H_5)_2$ | H | $CH_3$ | H |
| 19 | —$(CH_2)_3COOH$ | H | H | H |
| 20 | —$(CH_2)_5COOH$ | $OCH_3$ | H | H |
| 21 | —$(CH_2)_3CONH_2$ | H | H | H |
| 22 | —$NH_2$ | $CH_3$ | H | H |
| 23 | —$NH_2$ | $OCH_3$ | H | H |
| 24 | —$(CH_2)_3OCH_3$ | $CH_3$ | H | $CH_3$ |
| 25 | —$(CH_2)_7CH_3$ | $CH_3$ | H | $CH_3$ |
| 26 | —$(CH_2)_{17}CH_3$ | $CH_3$ | H | $CH_3$ |
| 27 | —$C_6H_5$ | H | H | H |
| 28 | —$CH_2COOH$ | H | H | H |
| 29 | —⟨⟩—$SO_2NH_2$ | $OCH_3$ | H | H |
| 30 | —⟨⟩—$CONH_2$ | $OCH_3$ | H | H |
| 31 | —⟨⟩—$NH_2$ | H | H | H |
| 32 | —$CH_2$—$CH_2$—$CH_3$ | Cl | H | H |
| 33 | —$CH_2$—$CH_2$—$CH_2$—$CH_3$ | H | Cl | H |
| 34 | —$CH_2$—$CH_2$—$CH_2$—$CH_3$ | —$(CH_2)_3CH_3$ | H | H |
| 35 | —$(CH_2)_7$—$CH_3$ | $CH_3$ | H | H |
| 36 | —$(CH_2)_{11}$—$CH_3$ | $CH_3$ | $CH_3$ | H |
| 37 | —$CH_2$—$CH_2$—O—CO—$CH_3$ | H | H | H |
| 38 | —$(CH_2)_3$—O—$(CH_2)_3$—$CH_3$ | H | $OCH_3$ | H |
| 39 | —H | H | H | H |
| 40 | —$NH_2$ | H | H | H |
| 41 | —OH | $CH_3$ | Cl | H |
| 42 | —⟨⟩ | $CH_3$ | H | Cl |
| 43 | —⟨⟩—$CH_3$ | Cl | $CH_3$ | H |

| Ex. | R | $R_1$ | $R_2$ | $R_3$ |
|---|---|---|---|---|
| 44 | –⟨phenyl⟩–H | $CH_3$ | H | H |
| 45 | pyridyl | H | Br | H |
| 46 | $-(CH_2)_3-O-(CH_2)_3-CH_3$ | $-CO-OCH_3$ | H | H |
| 47 | –⟨phenyl⟩–Cl | H | H | H |
| 48 | –⟨phenyl⟩–$OCH_3$ | $CH_3$ | $CH_3$ | H |
| 49 | –⟨phenyl⟩–OH | H | H | H |

We claim:
1. A compound of the formula

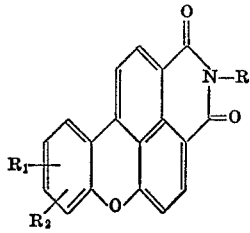

wherein R is hydrogen, hydroxy, amino, alkyl of 1 to 18 carbon atoms, hydroxy lower alkyl, lower alkoxy lower alkyl, lower alkoxy lower alkoxy lower alkyl, carboxyl lower alkyl, acetoxy lower alkyl, phenyl lower alkyl, di(lower alkyl)-amino lower alkyl, carbamoyl lower alkyl, cyclohexoxy lower alkyl, cyclohexyl, phenyl, sulfaminophenyl, carbamoyl phenyl, aminophenyl, lower alkyl phenyl, lower alkoxy phenyl, hydroxyphenyl, chlorophenyl, bromophenyl, di(lower alkyl)-phenyl, di(lower alkoxy)-phenyl or pyridyl-2, $R_1$ is hydrogen, chlorine, bromine, alkyl of 1 to 18 carbon atoms, lower alkoxy or carbo lower alkoxy, and $R_2$ is hydrogen, chlorine, bromine, lower alkyl, lower alkoxy or carbo lower alkoxy, said lower alkyl and lower alkoxy groups each being of 1 to 4 carbon atoms.

2. The compound according to claim 1 wherein R is $-NH_2$, $R_1$ is $-H$ and $R_2$ is $-H$.

3. The compound according to claim 1 wherein R is $-NH_2$, $R_1$ is $-OCH_3$ at the 4-position and $R_2$ is $-H$.

4. The compound according to claim 1 wherein R is $-CH_2CH_2CH_2OCH_3$, $R_1$ is $-H$ and $R_2$ is $-H$.

5. The compound according to claim 1 wherein R is $-CH_2CH_2CH_2OCH_3$, $R_1$ is $-OCH_3$ at the 4-position and $R_2$ is $-H$.

6. The compound according to claim 1 wherein R is

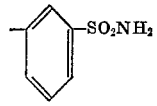

$R_1$ is $-OCH_3$ at the 4-position and $R_2$ is $-H$.

7. The compound according to claim 1 wherein R is $-(CH_2)_7CH_3$, $R_1$ is $-CH_3$ at the 4-position and $R_2$ is $-H$.

8. The compound according to claim 1 wherein R is $-CH_2CH_2OH$, $R_1$ is $-H$ and $R_2$ is $-H$.

References Cited
UNITED STATES PATENTS
3,330,834  7/1967  Senshu _____ 260—281
3,357,985  12/1967  Fuchs et al. _____ 260—281
3,367,937  2/1968  Fuchs et al. _____ 260—281

DONALD G. DAUS, Primary Examiner

U.S. Cl. X.R.
8—54.2, 179; 260—345.2

UNITED STATES PATENT AND TRADEMARK OFFICE
CERTIFICATE OF CORRECTION

PATENT NO. : 3,741,971
DATED : June 26, 1973
INVENTOR(S) : Otto Fuchs and Helmut Troster It is certified that error appears in the above-identified patent and that said Letters Patent are hereby corrected as shown below:

Column 3, line 2, replace "manner" by --manners--;
        line 4, after "neutral" insert a comma;
        line 16, replace "that" by --which--;
        line 17, replace "orgenic" by --organic--;
        line 28, replace "butllamine" by --butylamine--;
        line 36, replace "mdes" by --imides--, replace "n" by --in--.

Column 7, line 61, replace "benzoanthrene" by --benzoxanthrene--.

Column 10, line 10 (Claim 3), replace "4" by --10--;
        line 14 (Claim 5), replace "4" by --10--;
        line 23 (Claim 6), replace "4" by --10--;
        line 25 (Claim 7), replace "4" by --10--.

Signed and Sealed this

Ninth Day of May 1978

[SEAL]

Attest:

RUTH C. MASON
Attesting Officer

LUTRELLE F. PARKER
Acting Commissioner of Patents and Trademarks